United States Patent [19]

Sandefur et al.

[11] Patent Number: 4,474,577
[45] Date of Patent: Oct. 2, 1984

[54] MODIFIED ACID DYESTUFF

[75] Inventors: Charles W. Sandefur; Thomas J. Thomas, both of Summerville, S.C.

[73] Assignee: Mobay Chemical Corporation, Pittsburgh, Pa.

[21] Appl. No.: 545,795

[22] Filed: Oct. 26, 1983

[51] Int. Cl.$^3$ ............................................. D06P 67/02
[52] U.S. Cl. ............................................. 8/526; 8/589; 8/676; 8/679; 8/917; 8/924; 260/374
[58] Field of Search ............................ 8/526, 589, 676

[56] References Cited

U.S. PATENT DOCUMENTS

| | | | |
|---|---|---|---|
| 3,472,842 | 10/1969 | Hausermann et al. | 252/117 |
| 3,511,833 | 5/1970 | Tscharner | 252/543 |
| 3,770,371 | 11/1973 | Bossard et al. | 8/598 |
| 3,925,260 | 12/1975 | Tscharner et al. | 252/543 |
| 3,994,834 | 11/1976 | Dorlars et al. | 252/543 |
| 4,110,073 | 8/1978 | Mollet et al. | 8/549 |
| 4,327,999 | 5/1982 | Koller et al. | 8/526 |
| 4,329,144 | 5/1982 | Eugster et al. | 8/526 |
| 4,332,588 | 6/1982 | Eugster et al. | 8/526 |
| 4,374,640 | 2/1983 | Tappe et al. | 8/526 |
| 4,388,078 | 6/1983 | Thomas et al. | 8/514 |

FOREIGN PATENT DOCUMENTS 997044 6/1965 United Kingdom.
1293804 10/1972 United Kingdom.

*Primary Examiner*—A. Lionel Clingman
*Attorney, Agent, or Firm*—Gene Harsh; Lawrence S. Pope

[57] ABSTRACT

The present disclosure is concerned with new modifications of the dyestuff Color Index Acid Blue 324 which have significant advantages over the known form of this dyestuff. In particular, the preferred modification is much easier to isolate from an aqueous medium by filtration and the isolated product has a higher purity. The filtration proceeds much more rapidly and gives a filter residue of a much higher solids content. Furthermore, this new form of the dyestuff imparts a dramatically lower viscosity to aqueous dispersions or slurries prepared from it than are obtained using the old form of this dyestuff. These modifications are obtained by heating an aqueous dispersion or slurry of the known form of Color Index Acid Blue 324 to temperatures in excess of about 97° C. and for the preferred form in the presence of a substance which reduces the surface tension between the dispersed organic dyestuff phase and the aqueous dispersing medium. The obtained dyestuff modifications display Debye-Scherrer X-ray diffraction patterns substantially different from that of the commercially available Color Index Acid Blue 324 evidencing that new crystal forms have been obtained. This is confirmed by optical microscopy which shows that the dyestuff undergoes a transformation from sharp, thin needles to either parallelograms or hexagons.

23 Claims, 2 Drawing Figures

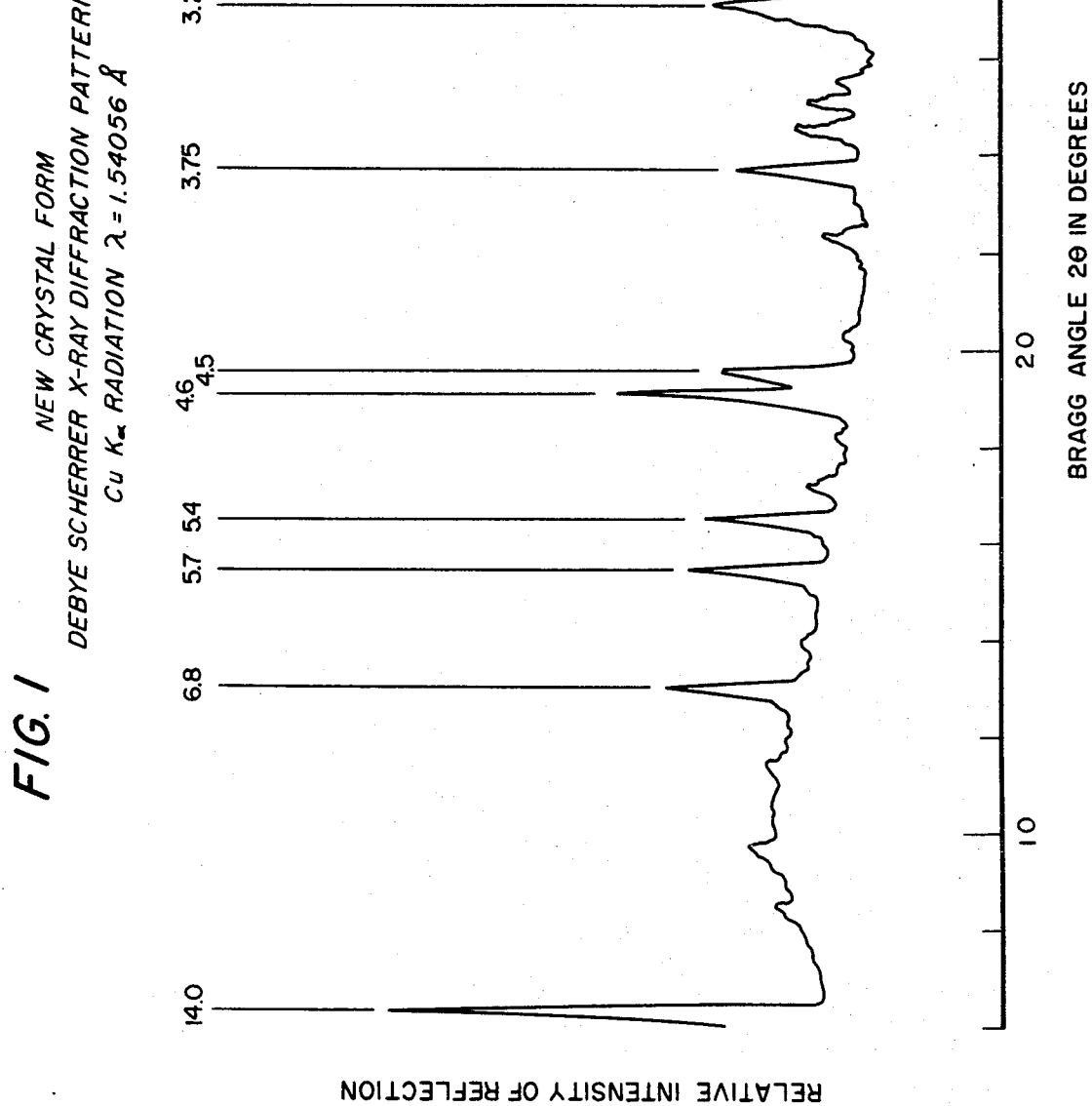

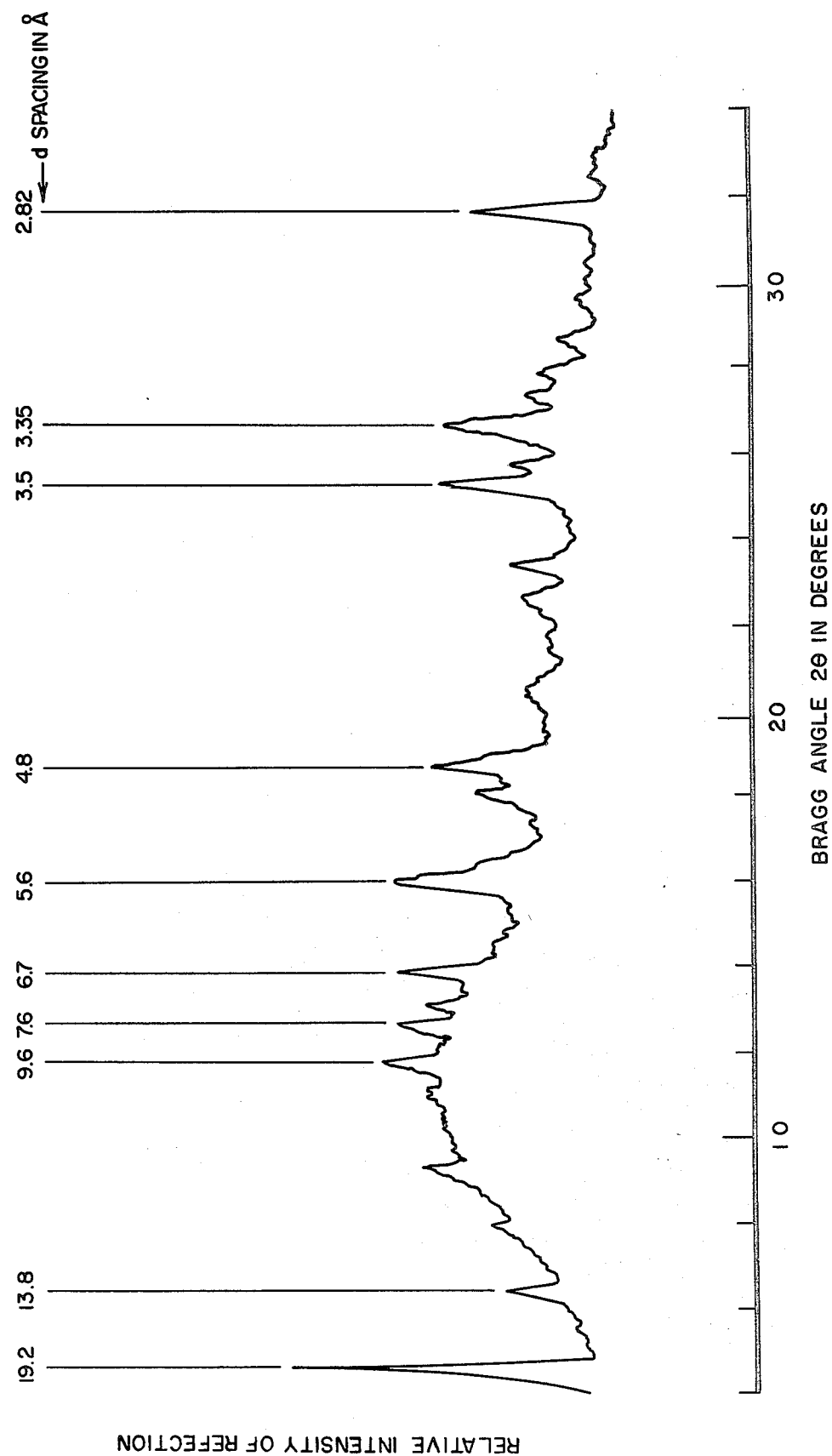

MODIFIED ACID DYESTUFF

FIELD OF THE INVENTION

The present invention is concerned with new modifications of an acid dyestuff known for its utility in dyeing both wool and nylon and a process for obtaining these dyestuff modifications.

BACKGROUND OF THE INVENTION

The acid dyestuffs were originally developed for the coloration of wool and consequently were provided with some degree of water solubility. It was generally believed that such dyestuffs went into solution before they affected coloration of the wool substrate. This mechanism was thought to be applicable to all of the acid dyes including those based upon anthraquinone chromophores. It was therefore believed that the crystal form of such dyestuffs was irrelevant to their dyeing behavior and was apparently not very intensively investigated.

Some of these dyestuffs were later found to have utility in coloring other types of fabrics such as polyamides but dissolving the dyestuffs remained an important feature of applying it to the substrate. The conditions of application and the nature of the substrate were changed but these changes provided no new motivation to investigate the crystal structure of the acid dyestuffs.

This lack of interest in the crystal structure is probably attributable to the fact that the acid dyestuffs are typically dissolved before application thus destroying any crystal structure which they might have possessed. This is in sharp contrast to the other great class of colorants, pigments, which are applied without dissolution. Therefore, both the crystal structures of pigments and methods of altering such crystal structures have been intensively studied.

The crystal modification of a dyestuff which does not dissolve in a dye bath but is believed to dissolve in the fiber being dyed has been reported. In particular, U.S. Pat. No. 4,388,078 reports the crystal modification of a disperse dye which alters its "pre-dyeing" property of aqueous dispersion stability.

The crystal form modification of textile dyeing auxiliaries which are dissolved before application have also been reported. In particular, U.S. Pat. Nos. 3,472,842, 3,511,833, 3,925,260 and 3,994,834 and United Kingdom Pat. Nos. 997,044 and 1,293,804 report the crystal form modification of optical brighteners in order to improve their color in dry formulations such as laundry detergents.

BRIEF DESCRIPTION OF THE DRAWINGS

FIGS. 1 and 2 are Debye-Scherrer x-ray diffraction patterns generated using the K alpha emission line of a copper target to obtain radiation with a wave-length of 1.54056 Å. The abscissa presents twice the diffraction angle in degrees and the ordinate presents the relative intensity of reflection. The d-spacings corresponding to selected reflection peaks is presented across the top of the figures. FIG. 1 is representative of the preferred crystal structure of the present invention whereas FIG. 2 is representative of the crystal structure of the dyestuff as it is typically obtained in commerce. FIG. 2 is at twice the magnification of FIG. 1.

SUMMARY OF THE INVENTION

The present invention comprises particular modifications of Color Index Acid Blue 324 which has the following structure:

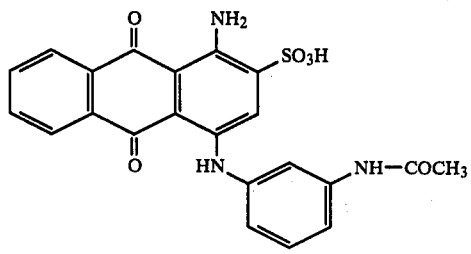

and a process for obtaining these modifications. These modified dyestuffs are characterized by a Debye-Scherrer x-ray defraction pattern which have reflections of the following strengths representative of the following lattice plane spacings:

| Relative Reflection Strength | d-spacing (in Å) | |
|---|---|---|
| | Preferred Modification | Alternate Modification |
| Very strong | 14.0 | 14.0 |
| Strong | 4.6 | |
| Fairly strong | 3.29 | 4.6 |
| Moderately strong | 6.8 | |
| Moderately strong | 5.7 | |
| Moderately strong | 5.4 | |
| Moderately strong | 4.5 | |
| Moderately strong | 3.75 | |

The present invention also comprises the process of heating Color Index Acid Blue 324 at temperatures in excess of about 97° C. preferably in the presence of an agent which reduces the surface tension between water and a material dispersed in the water. In an especially preferred embodiment Color Index Acid Blue 324 is dispersed into an aqueous medium in which it is not completely soluble which contains a surfactant and the dispersion is heated at temperatures in excess of about 100° C.

DETAILED DESCRIPTION OF THE INVENTION

The present invention involves the modifications of the crystal structure of Color Index Acid Blue 324 which are obtained upon subjecting this dyestuff to certain particular conditions. This dye as recovered from its synthesis bath typically appears as sharp thin needles under microscopic examination. Upon transformation to the preferred modification of the present invention, these needles change into parallelograms with typical side lengths of between 20 and 50 microns. This new modification filters much more readily from an aqueous medium than the original form of the dye. Furthermore, it displays a much lower viscosity when it is dispersed into an aqueous medium at the same solids loading as the standard form of the dye. It also allows the recovery of a purer dye from an aqueous medium. Finally, a much higher percentage of solids may be obtained by filtration from an aqueous medium. Upon transformation to the alternative form these needles change into hexagonal crystals about 150 microns on a side. This modification also filters more readily from an aqueous medium to give a higher solids content filter cake.

The new modifications have drastically reduced filtration times compared to that of the standard dye. This is an important feature because this dye is typically recovered or isolated from its synthesis bath by filtration as can be seen from column 2, lines 6 and 7 of U.S. Pat. No. 4,146,363. The more rapidly this filtration can be effected the more efficient the production process will be. In an evaluation at 75° C. utilizing 1200 g of a 12% solids dyestuff slurry, an 11 cm diameter #4 Whattman filter paper and a vacuum of 25" of mercury, the preferred modification of the present invention took between 60 and 80 seconds to filter whereas the standard form of the dye typically took as long as sixteen minutes. The alternate modification had a typical filtration time of about 10 minutes.

The preferred modification of the present invention imparts a much lower viscosity to an aqueous dispersion than the standard form of the dye. For example, in an aqueous dispersion containing approximately 30 wt. % of dyestuff, 7 wt. % of a sodium lignin sulfonate and about 1 wt. % of sodium chloride, the modification of the present invention caused a room temperature viscosity at 12 rpm of approximately 15 cps, whereas the standard form of the dye caused a similar dispersion to have a room temperature viscosity of 2700 cps at 12 rpm. In both cases, the dyestuff had been subjected to cavitation milling which gave the dispersed particles an average particle size of approximately 2 microns. In both cases the pH of the dispersion was adjusted to approximately 7. This lower viscosity phenomena is observed over a wide range of solids contents. For instance, an aqueous dispersion containing 51.2 wt. % of solids (comprised of dyestuff and presscake salt) and approximately 5% of the sodium lignin sulfonate has a room temperature viscosity at 12 rpm of approximately 25 cps which is increased to 2200 cps at 12 rpm upon glass bead milling of the dispersion. Thus, at not quite double the solids loading, the preferred modification of the present invention still does not cause an aqueous dispersion to have as high a viscosity as one based upon the standard form of the dye. This is even more impressive when it is considered that glass bead milling typically gives a much finer particle size and consequently a higher viscosity for any given dispersed material than cavitation milling. Thus the preferred modification of the present invention enables the preparation of 30 wt. % solids aqueous dispersions having room temperature viscosities at 12 rpm of under about 100 cps and similarly the preparation of 50 wt. % aqueous dispersions having 12 rpm room temperature viscosities under 3000 cps.

The preferred modification of the present invention can be recovered in a significantly purer form than the standard form of this dyestuff. In particular, this modification displays a significantly higher absorbance at the lamda max absorption peak for the dyestuff than does an equal weight of the standard form of this dye. For example, if both materials are recovered from an aqueous medium by filtration, dried and then dissolved for visible light spectroscopy, this modification will display a strength between 256 and 266 with an average value of 262, whereas the standard form of the dye will display a strength of between 220 and 228 with an average value of approximately 226. The base value of 100 corresponds to the expected strength of commercially formulated Color Index Acid Blue 324 and is denominated powder type equivalent or PTE.

The modifications of the present invention can be obtained in a much drier form upon filtration from an aqueous medium than can the standard form of this dye. The presscake obtained upon filtration of the preferred modification of the present invention typically has a solids content of approximately 86 wt. % and the alternative modification typically has a solids content of approximately 67 wt. %, whereas the presscake of the standard form of this dye typically has a solids content of approximately 50 wt. %. This is an extremely significant advantage not only in the initial production of this dyestuff but also with regard to the ability to subsequently handle it. If the modification of the present invention is effected before isolation of the dyestuff from its synthesis bath, very substantial advantages in its isolation and subsequent treatment can be realized. For instance, with the preferred modification faster techniques of filtration such as a continuous belt filter may be utilized. The standard form of the dye must typically be isolated by the much less efficient bath process of a filter press. Furthermore, much less energy will be required to dry the recovered dyestuff particularly if it is subjected to tray drying. Thus, the two modifications can be characterized as giving filter residue with a solids content in excess of about 80% or 60%, respectively.

The low viscosity of aqueous slurries based upon the preferred modification of the present invention permits the use of an alternative drying and standardization procedure. The dyestuff may be spray dried using a much higher solids content slurry than can be used with the standard form which means a significantly lower heat input will be required at the spray dryer. Furthermore, it is believed that spray drying a higher solids contents slurry will result in recovered powder having a higher bulk density, thus allowing greater weights of dyestuff to be packed in smaller volumes. Typical spray drying slurries have solids contents of between about 20 and 30 wt. %, whereas it is evident that the modification of the present invention has a sufficiently low viscosity as a 40 or 50% slurry in water to be directly spray dried.

The modifications of the present invention may be obtained by heating an aqueous dispersion of standard Color Index Acid Blue 324. The presence of a material which lowers the surface tension between the organic phase dyestuff and the aqueous dispersing medium is required to obtain the preferred modification. The modification typically occurs at a temperature in excess of about 97° C. The material which lowers surface tension between the phases may be any of the art recognized dispersants or surfactants. Because the dyestuff molecule of Color Index Acid Blue 324 carries a sulfonic acid group it is preferred to avoid the use of cationic dispersants or surfactants. The anionic dispersants are particularly preferred especially the lignin sulfonates. U.S. Pat. Nos. 3,770,371 and 4,110,073 both contain extensive disclosures of suitable dispersants. Suitable dispersants may be characterized by having a molecular structure wherein a portion of the molecules is particularly compatible with organic materials and a portion of the molecule is particularly compatible with water. The water compatibility is imparted by anionic salt groups, particularly carboxylate or sulfonate groups.

Preferred dispersants are those that contain one or more sulfonate groups, particularly those in which the counter ion is an alkali metal, and most especially those in which the counter ion is sodium. Especially preferred dispersants are the sulfonated condensation products of naphthalene and formaldehyde and lignin sulfonate with the latter being most preferred. Particularly preferred are the lignin sulfonates or derivatives thereof which are sodium salts; have low or no sugar content; have molecular weights between 5000 and 50,000; and have between 0.5 and 5 sulfonic acid groups per thousand molecular weight units. Especially preferred lignin sulfonates are the non-staining variety which do not impart substantial coloration to an undyed skein.

Other suitable dispersants include: alkyl sulfonates; sulfonated unsaturated, fatty acids; sulfonates of polycarboxylic acid esters; alkyl benzene sulfonates; sulfonated aliphatic alcohols; condensation products of ethylene with amine, fatty acids, phenols or alcohols which are then treated with sulfuric acid and neutralized to form salts which will dissociate in water to give anions. Specific examples of suitable dispersants include sodium dodecyl sulfonate, sodium lauryl sulfate, dibutyl naphthylene sulfonate, acidic sulfuric acid esters of the condensation products of ethylene oxide with nonyl phenol, sodium dioctylsulfosuccinate, condensation products of cresol, $NaHSO_3$ and formaldehyde, condensation products of 2-hydroxy naphthylene-6-sulfonic acid with formaldehyde, sulfonic acids of condensation products of naphthylene, terphenyl or ditolyl ether with formaldehyde, and condensation products of cyclohexanone with formaldehyde and $NaHSO_3$. All of these anionic dispersants are preferably used as their alkali and/or ammonium salts.

The modifications are obtained by heating at temperatures in excess of about 97° C. It is convenient to heat the aqueous dispersion to reflux. Since this dispersion will typically contain some electrolytes, reflux will typically occur at temperatures between about 102° and 103° C. At too low a temperature, essentially no conversion is observed whereas at a sufficiently high temperature essentially complete conversion is observed.

The conversion to the modifications of the present invention proceeds fairly rapidly once an appropriate temperature has been reached. At reflux complete conversions to the preferred modification were obtained in between 3 and 6 hours with the first of the parallelogram crystals being observed after between 30 and 45 minutes. The speed of this reaction is somewhat influenced by both pH of the aqueous dispersion being treated and the dispersion's content of dispersant. At pH values below 7, the conversion is substantially slowed down and at a pH of 6 the formation of the characteristic parallelogram crystals is accompanied by the formation of substantial amounts of amorphous dyestuff and impurities. The filtration is much slower, the solids content of the filter residue is reduced and the spectral strength of the dried dyestuff is reduced. At pH values between about 7 and 10, complete conversion to the modification of the present invention is routinely obtained and the conversion time appears to be independent of the particular pH value.

The conversion to the alternative modification proceeds somewhat slower with the first hexagonal crystals typically appearing after one hour and substantial amounts of these crystals being present after two hours. Complete conversion is somewhat more difficult to obtain.

There appears to be an optimum amount of dispersant which minimizes the conversion time to the preferred form. For sodium lignin sulfonate this optimum amount appears to lie between 1 and 7 wt. % based on the total weight of the dispersion. When a 1200 gram reaction slurry obtained from the standard synthesis of Color Index Acid Blue 324 which has a solids content of approximately 12% and a pH of about 8.4 was combined with a sodium lignin sulfonate and heated to reflux the following correlation was obtained:

| Amount of Dispersant | Conversion Time |
|---|---|
| 1% | 4.5 hours |
| 4% | 3 hours |
| 7% | 4 hours |
| 10% | 6 hours |

Conversion was judged by microscopic evaluation of the treated dyestuffs. Conversion was judged to be complete when all of the dyestuff appeared to be in form of parallelogram crystals. All four of these dispersions filtered in between 1 and 2 minutes.

The conversion can also be judged by the viscosity of the slurry undergoing treatment. Upon conversion it becomes essentially water thin, i.e. less than 25 cps at 12 rpm.

The solid contents of the aqueous dispersion treated is not critical so long as some of the dyestuff being treated is out of solution at the treatment temperature. If sufficient dyestuff solids are utilized in preparing the dispersion, there will be dyestuff present in excess of its solubility limits at the treatment temperature. In addition, electrolyte can be deliberately added to the dispersion to ensure insolubility of the dyestuff at the treatment temperature. Furthermore, dyestuffs obtained from a typical synthesis have an inherent electrolyte content which may be sufficient. However, it is evidently not critical that all of the dyestuff be out of solution at the treatment temperature and in fact, suitable dispersions may display bleed evidencing some dissolved dyestuff even at room temperature.

Any electrolyte meeting the classical definition may be suitably utilized in the present invention. Such materials are typically characterized by high water solubility and low molecular weight. The water soluble salts of inorganic or organic mono- or polybasic acids which are described in U.S. Pat. No. 3,770,371 are among the suitable materials referred to as electrolytes in the present application. The alkali metal or ammonium salts are particularly preferred, particularly those of the mineral acids or lower molecular weight organic acids such as acetic acid or oxalic acid. Salts of hydrochloric acid, sulfuric acid and the various phosphorus based acids are especially preferred. Suitable salts include sodium acetate, lithium chloride, lithium sulfate, sodium chloride, sodium sulfate, potassium chloride, potassium sulfate, ammonium chloride and ammonium sulfate. The most preferred salt in terms of availability and cost is sodium chloride.

All or part of the electrolyte utilized to suppress the solubility of the Color Index Acid Blue 324 may be present in this dyestuff as a result of its method of synthesis and isolation. In this regard, this dyestuff is synthesized from the well known intermediate bromamine acid (1-amino-4-bromoanthraquinone-2-sulfonic acid) and synthesis from this intermediate typically results in a dyestuff with some inherent electrolyte content. Furthermore, the synthesis of this dyestuff may involve the addition of sodium sulfate to precipitate it from its synthesis bath.

The Color Index Acid Blue 324 starting material may be in a variety of forms. If it is used as an absolutely pure chemical compound, it may be necessary to add an electrolyte to the bath used to effect the modification. On the other hand typical presscake of this dyestuff and the aqueous slurry obtained by typical synthesis before isolation by filtration both apparently contain sufficient electrolyte to be directly used in the modification process of the present invention.

It is critical to obtaining the preferred form that a minimum amount of a surface tension reducing material be utilized based upon the weight of dyestuffs being treated. For example, complete conversion can be obtained with a reaction slurry having a solids content of approximately 12% in about 4½ hours utilizing 1 wt. % of sodium lignin sulfonate based on the total weight of the dispersion. This corresponds to a surfactant to dyestuff ratio of approximately 0.08. On the other hand, if 1 wt. % of the same dispersant based on the total weight of the dispersion is utilized with a dispersion having a solids content of approximately 22%, conversion to the alternative modification is obtained. This corresponds to a dispersant to dyestuff ratio of approximately 0.045. It is therefore believed that a dispersant to dyestuff ratio in excess of about 0.05 is necessary to affect the modification to the preferred form.

The invention is further illustrated, but is not intended to be limited by the following examples in which all parts and percentages are by weight unless otherwise specified.

EXAMPLES

Example 1

The preferred modification of the present invention was prepared by adding 600 grams of commercially obtained presscake of Color Index Acid Blue 324 having a solids content of 50% and 76 grams of sodium lignin sulfonate having a water content of 6 grams to 324 grams of water. Observation of this starting material under a microscope at magnifications of 160 and 640 times revealed that it consisted of thin, sharp needles between about 8 and 10 microns in length. The pH of this aqueous dispersion or slurry was adjusted to 7.4 with a 20% solution of phosphoric acid. This slurry was then heated to reflux, approximately 102° C., and held at temperature for approximately 18 hours. Samples of the material undergoing treatment were microscopically examined periodically. No change was observed until approximately 45 minutes when well-defined, sharp edged, parallelograms were observed. After two hours of treatment, no further needles characteristic of the starting material presscake were observed. No further changes in the dyestuff undergoing treatment were observed for the balance of the 18 hours.

The modified dyestuff was isolated by cooling it to 30° C. and then filtering it. Using a 11 cm diameter #4 Whattman filter paper and a vacuum of 25" of mercury, filtration was completed in less than 1 minute. The solids content of the filter residue was determined by moisture balance to be 86.3 wt. %.

Example 2

The alternative modification of the present invention was prepared by adding 600 grams of the same presscake as utilized in Example 1, i.e. a commercial Color Index Acid Blue 324 presscake having a solids content of 50%, to 400 grams of water. The pH of the slurry was adjusted to 7.4 with 20% phosphoric acid and it was refluxed for 24 hours. It was then cooled to 30° C. and filtered in the same manner as Example 1. The filtration took approximately 2 hours and gave a filter residue with a solids content by moisture balance of 67.6 wt. %. On microscopic examination, it was found that the dyestuff was in the form of hexagonal crystals clearly different from the parallelogram of Example 1.

Example 3

The preferred modification was also obtained by treatment of the reaction slurry obtained from a commercial synthesis of Color Index Acid Blue 324. 1200 grams of reaction slurry obtained before filtration in a commercial synthesis process was combined with 91.3 grams of a sodium lignin sulfonate that had a solids content of 92.%. The slurry had a pH of 8.4. It was held at reflux, between 102° and 103° C., for approximately 18 hours. The mixture was then cooled to 75° C. and filtered through 11 cm diameter #4 Whattman filter paper using a vacuum of 25" of mercury. The filtration took approximately 60 seconds and yielded a filter residue which had a solids content by moisture balance of 87.1 wt. %. Microscopic examination of the recovered dyestuff revealed it was in the form of sharp edged parallelograms with average side lengths between 20 and 50 microns.

Example 4

The alternative modification was also prepared from a reaction slurry. 1200 grams of the reaction slurry used in Example 3 was held at reflux for 22 hours. The dyestuff undergoing treatment was microscopically examined periodically during this period. After approximately 1 hour of treatment, hexagonal crystals began to appear and a significant amount of such crystals were present after about 2 hours. However, sharp, thin needles characteristic of the starting materials were still present after 6 hours and a conversion to the hexagonal crystals was not completed after the full 22 hour treatment. This treated reaction slurry was filtered in the same manner as Example 3 and took approximately 550 seconds to complete the filtration. The filter residue had a solids content by moisture balance of 66.8 wt. %. Essentially the same slurry without thermal treatment took about 16 minutes to filter under the same conditions and gave a filler residue having a solids content of 49.8 wt. % by moisture balance. Upon microscopic examination, the hexagonal crystals appeared to have a length to width ratio of approximately 5-6 to 1 and to have a typical side length of about 150 microns. X-ray crystallography confirmed that this material had a crystal form different from both the Color Index Acid Blue 324 starting material and the preferred modification. It had a very strong reflection representative of a d-spacing of 14 Å and a fairly strong reflection representative of a d-spacing of 4.6 Å. Weak reflections representative of d-spacings of 5.4 Å and 4.5 Å were observed but no other significant peaks were observed Example 5

Treatment dispersions or slurries were made up using 440 and 600 grams of 50% solids Color Index Acid Blue 324 presscake. These slurries also included approximately 11 grams of 92% solids sodium lignin sulfonate and sufficient water to give the total slurry a weight of 1,000 grams. Both slurries thus had a surfactant content of 1 wt. % and surfactant to dyestuff ratios of 0.05 and 0.033, respectively. Both slurries were then refluxed for 18 hours and filtered in the manner of Example 1, i.e., by cooling to 30° C. and then being passed to an 11 cm

4 Whattman filter paper using a vacuum of 25" of mercury. The filtration was very poor. On microscopic examination the treated material was in the form of the same hexagonal crystals as Examples 2 and 4.

Example 6

An aqueous dispersion was prepared utilizing 59 wt. % of the filter cake having a solids content of 86 wt. % obtained by isolating the modification of the present invention and 5 wt. % of a sodium lignin sulfonate having a solids content of 92%. This dispersion was subjected to size reduction in a glass bead mill causing the dispersed particles to have an average particle size of about 1 micron. This dispersion had a room temperature viscosity of 2250 cps at 12 rpm. At the end of 21 days, the dispersion was still stable.

Example 7

An aqueous slurry was prepared utilizing 440 grams of Color Index Acid Blue 324 having a solids content of 50% and 560 grams of water. The dyestuff was in the form of thin, sharp needles. The pH of the slurry was adjusted to 7.3 with 20% phosphoric acid. The slurry was heated to reflux, about 102° C., and held for 24 hours. The material was cooled to 30° C. and passed to an 11 cm diameter Whattman #4 filter paper and then subjected to a vacuum of 25" of mercury. The material was extremely difficult to filter and liquid was still being retained after 18 hours. The dyestuff was now completely in the form of elongated, hexagonal crystals which had a length to width ratio of 5–6 to 1 with an average length of about 150 microns very similar to those observed in Examples 2, 4 and 5.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A modified form of the dyestuff Color Index Acid Blue 324 selected from the group consisting of a form displaying very strong to moderately strong Debye-Scherrer X-ray diffraction pattern reflections representative of d-spacings at approximately 14.0; 6.8; 5.7; 5.4; 4.6; 4.5; 3.75 and 3.29 angstroms and one displaying such reflections only representative of d-spacings at approximately 14.2 and 4.6 angstroms.

2. A modified form of the dyestuff Color Index Acid Blue 324 selected from the group consisting of one displaying a solids content in excess of about 80 wt. % on filtration from an aqueous medium in which it is slurried and one displaying a solids content between about 60 and 80 wt. %.

3. A form of the dyestuff of the following structural formula:

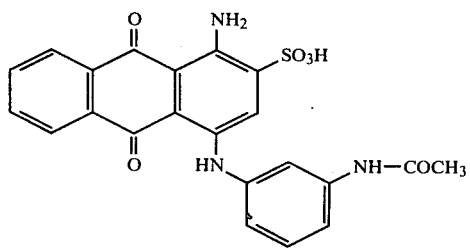

which displays very strong to moderately strong Debye-Scherrer X-ray diffraction pattern reflections representative of d-spacings at approximately 14.0; 6.8; 5.7; 5.4; 4.6; 4.5; 3.75; and 3.29 angstroms.

4. A form of the dyestuff of the following structural formula:

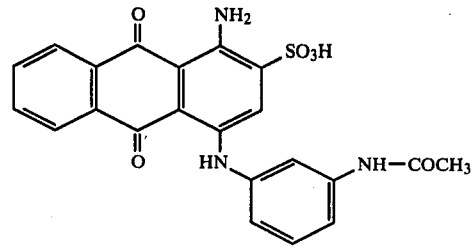

which is characterized by the X-ray diffraction pattern of FIG. 1.

5. A form of the dyestuff Color Index Acid Blue 324 which displays a solids content in excess of 80 wt. % upon filtration from an aqueous medium in which it is slurried.

6. A form of the dyestuff Color Index Acid Blue 324 which can be dispersed at a 30 wt. % solids level into an aqueous medium without causing the room temperature viscosity at 12 rpm of the dispersion to exceed about 100 cps.

7. The form of the dyestuff Color Index Acid Blue 324 which is obtained by subjecting the dyestuff in the form of sharp thin needles to a temperature in excess of 97° C. in an aqueous medium having a pH of 7 or greater which also contains a material which reduces the surface tension between the dyestuff and the aqueous medium with the weight ratio of this material to the dyestuff being greater than about 0.05 until the dyestuff is in the form of sharp edged parallelograms.

8. A process for producing an improved form of the dyestuff of the structural formula

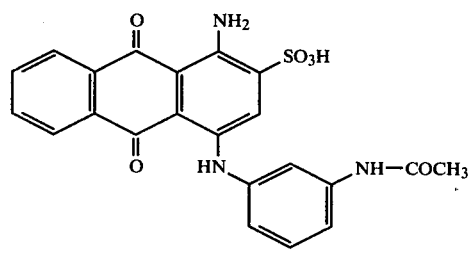

comprising slurrying it in an aqueous medium which has a pH in excess of about 6.0 and which also contains a material which reduces the surface tension between the organic dyestuff phase and the aqueous medium with the weight ratio of this material to the dyestuff being greater than about 0.05 and maintaining this slurry at a temperature in excess of about 97° C. until the dyestuff is in the form of sharp edged parallelograms.

9. The process of claim 8 wherein the surface tension reducing material is a surfactant or dispersant.

10. The process of claim 9 wherein the dispersant or surfactant is anionic.

11. The process of claim 10 wherein the dispersant is a sodium lignin sulphonate.

12. The process of claim 8 wherein the slurry is held at reflux until the improved form is obtained.

13. The process of claim 8 wherein the pH of the aqueous medium is greater than about 7.0.

14. The process of claim 13 wherein the pH of the aqueous medium is between about 7 and 10.

15. The process of claim 8 wherein the weight ratio of surface tension reducing material to dyestuff is at least about 0.08.

16. A process for producing an improved form of the dyestuff Color Index Acid Blue 324 comprising slurrying it in an aqueous medium which has a pH in excess of about 6 and which also contains a material which reduces the surface tension between the organic dyestuff phase and the aqueous medium with the weight ratio of this material to the dyestuff being greater than about 0.05 and maintaining this slurry at a temperature in excess of about 97° C. until the viscosity of the slurry ceases to decrease.

17. The process of claim 16 wherein:
(a) the pH is at least about 7;
(b) the surface tension reducing material is an anionic surfactant or dispersant;
(c) the weight ratio of dispersant to dyestuff is at least about 0.08; and
(d) the slurry is held at reflux until its viscosity ceases to decrease.

18. A process of dispersing a Color Index Acid Blue 324 having a crystal structure with d-spacings at approximately 14.0; 6.8; 5.7; 5.4; 4.6; 4.5; 3.75 and 3.29 angstroms comprising combining the dyestuff with water and agitating.

19. The process of claim 18 wherein the room temperature 12 rpm viscosity of the dispersion at 30% solids is less than 100 cps and at 50% solids is less than 3000 cps.

20. A process of spray drying the dyestuff Color Index Acid Blue 324 comprising using a slurry of at least 40 wt. % solids of the crystal form having d-spacings at approximately 14.0; 6.8; 5.7; 5.4; 4.6; 4.5; 3.75 and 3.29 angstroms.

21. A process of recovering the dyestuff Color Index Acid Blue 324 from its synthesis bath comprising
(a) adding an anionic surfactant or dispersant to the reaction slurry in a weight ratio to the dyestuff present of greater than about 0.05;
(b) controlling the pH of the slurry to a value in excess of 6;
(c) holding the slurry at a temperature in excess of about 97° C. until either the viscosity of the slurry ceases to decrease or the dyestuff is in the form of sharp edged parallelograms; and
(d) isolating the dyestuff by filtration.

22. The process of claim 19 wherein the filtration is accomplished by a continuous belt filter.

23. A process for modifying the dyestuff Color Index Acid Blue 324 obtained in the form of thin sharp crystals comprising slurrying it into an aqueous medium which has a pH in excess of about 6 and which contains less than 5 wt. %, based on the weight of the dyestuff, of a substance which reduces the surface tension between the organic dyestuff phase and the aqueous medium and holding the slurry at a temperature in excess of about 97° C. until a substantial portion of the dyestuff is in the form of hexagonal crystals.

* * * * *